3,445,255
**FOREHEARTH ADDITION PROCESS FOR
VISCOSITY CHANGE**
Joseph R. Monks, Jr., Toledo, Ohio, assignor to
Owens-Illinois, Inc., a corporation of Ohio
Filed Aug. 25, 1966, Ser. No. 575,179
Int. Cl. C03c *17/04;* C03b *5/13*
U.S. Cl. 106—52                                          10 Claims The present invention pertains to improved methods of forming glass articles. More particularly, the present invention relates to improved methods of forming glass articles in conventional glass forming equipment.

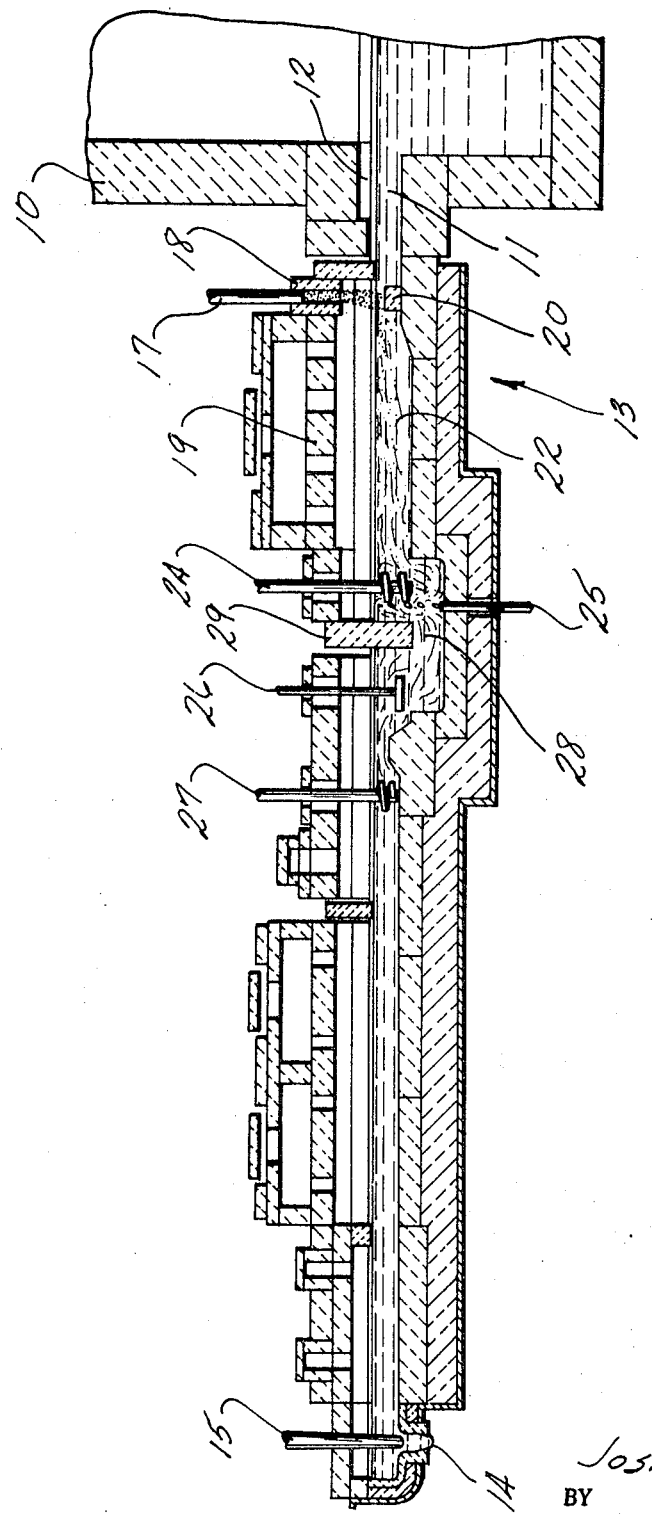

In the glass industry today, ordinary articles of commerce such as bottles, jars or the like, are formed by high speed molding or forming processes. Such forming processes and machines for carrying out these processes are well-known in the art and are discussed in "Handbook of Glass Manufacture" by Tooley, Ogden Publishing Co., New York, N.Y. 1953, p. 303 et seq.

Generally speaking, there are three major factors influencing the forming characteristics of any glass article, namely:

(1) The geometry (size, shape and weight) of the desired article;
(2) The properties of the glass composition utilized;
(3) The characteristics of the forming equipment.

In commercial glass container manufacturing operations, economic considerations require that glass containers of varied sizes and shapes be capable of being formed on one forming machine over relatively short time periods in order to fill the needs of the various customers. For instance, on a single machine small, relatively thin-walled bottles such as perfume bottles may be made for part of the operating day to fill one order; the next order may call for several hours production of large, relatively thick walled, soft drink bottles; this order may be followed by the manufacture of relatively thin-walled, one-way beer bottles, and so on. As the size, shape and weight of the glass containers are varied, there must be a corresponding change in one or more of the above-mentioned factors to assure uniformity of operation.

In most commercial operations the glass is essentially a soda-lime-silica composition selected on the basis of its overall properties within the ranges determined by economic factors. While this composition may have satisfactory forming properties for certain sizes and shapes, it is often desirable to modify the forming properties for the reasons stated above.

One of the most critical glass forming properties, dependent on composition, is the viscosity-temperature relationship.

Desirable viscosities for forming and working glasses are set forth by Tooley (supra) at p. 373. Also on this page, are defined the terms "working range" and "setting rate." "Working range" is the range of viscosities in which ordinary forming processes can be readily carried out, and is generally thought to be between $10^3$ and $10^7$ poises. "Setting rate" refers to the time required for a given thickness of the glass to cool between the limits of the working range under standardized ambient conditions. The setting rate (usually expressed in seconds) can then be said to described the rate of change of viscosity with temperature between those temperatures which are considered to be the upper and lower working limits of the glass. A short time period implies a fast setting glass and a long time period implies a slow setting glass.

When comparing glasses of the same color and heat emissivity characteristics, under similar ambient conditions, the setting rates can be related to the slope of the viscosity-temperature curve. Since the heat transfer characteristics (and thereby the temperature) of the glass article being fabricated are directly related to the geometry of the article, it is evident that the viscosity at a given point in the forming process will also be variable. For example, it may be possible to produce relatively thin-walled, light weight glass containers such as the one-way beer bottle at twice the rate that heavy, relatively thick-wall bottles such as "coke" bottles can be produced. This is because the "coke" bottle, being heavier and thicker, will retain more heat and therefore requires a longer cooling period after formation in order to insure dimensional stability.

In view of the above, it is seen that a significant contribution to the art would be realized if a method were devised for altering the viscosity-temperature relationship in ordinary soda-lime glasses to facilitate the fabrication of glass articles of various sizes and shapes.

Accordingly, it is an object of the present invention to provide a method of altering the viscosity-temperature relationship of ordinary soda-lime glass that can be readily practiced in conventional glass forming and melting equipment.

Another object of the present invention is to provide a method of altering the viscosity of soda-lime glasses to achieve a family of faster setting glasses.

Another object of the present invention is to provide a method of producing a family of faster setting glasses by admixing a small amount of a glass frit with the glass in the forehearth of a conventional glass melting furnace.

Another object is to provide a novel method of producing soda-lime glasses having a setting rate of less than 94 seconds.

Still another object is to provide a method of admixing a small amount of frit glass in the forehearth of a glass melting furnace to significantly alter the viscosity-temperature-relationship of the base glass without adversely affecting the other glass properties.

Yet another object is to provide a method of admixing a molten vitreous material with a soda-lime base glass in the forehearth of a conventional glass furnace to produce a faster setting composite glass.

Another object of the present invention is to provide a method of altering the viscosity of a soda-lime glass by the forehearth addition of a glass frit with or without colorants, to achieve a faster setting glass and thereby increase the rate of production in those situations where deformation or slumping of the formed article is the limiting factor.

The drawing is a longitudinal sectional elevation of a preferred form of a forehearth apparatus of the known type glass melting furnace that can be used in practicing the invention.

The base glass is melted and refined in the furnace tank 10. The molten glass 11 flows through the furnace outlet 12 into the channel provided by the forehearth 13. The forehearth is provided at its forward end with an outlet 14 or other means for the discharge of the glass which may be under the control of plunger 15. The plunger may be operated in a known manner to control the volume of glass passing through the outlet 14 either by adjustment with respect to the outlet to control the flow therethrough, or by reciprocations thereover to discharge gobs of glass therethrough.

The frit glass is fed to the surface of the glass in the forehearth channel from a feeder tank (not shown) through the discharge spout 17. Discharge blocks 18, built into the upper wall or roof of the forehearth 19, are formed with vertical channels in register with the spout 17 through which the frit falls by gravity into the forehearth. The frit, when in a powdered or granulated form, is spread over the surface of the flowing glass. The frit falls on the glass while passing over a dam 20. The dam is constructed of ZAC or other refractory material.

The dam serves to produce a comparatively rapid local surface flow of the glass which aids in admixing the frit and base glass.

The forehearth comprises a section or chamber 22, through which the frit is carried and in which it is melted. The temperature in this section must be at least as high as the melting temperature of the frit and is usually maintained about 2,200–2,600° F.

In the well section 28, the temperature is generally lowered approximately 50° F. by the water cooled stirring members 26 and from this point on, the glass is gradually cooled to an average operating temperature at outlet 14 of about 2,070° F. Means for effecting a thorough mixing of the melted frit with the base glass include a first set of stirrers 24, bubblers 25, a second set of stirrers 26 and a third set of stirrers 27. The forehearth is formed with a well 28 and a deep well skimmer 29 extending downward within the well.

In another form, the frit may be added in the molten state. It is therefore contemplated herein that the term "frit" may include either form of the glassy material. Additionally, it is contemplated that colorants such as chromium, cobalt, etc. may be incorporated into the frit.

The amount of frit entering the forehearth is usually only a small fraction of the amount of base glass flowing from tank 10, the proportion depending upon the composition of the frit, the setting rate desired in the composite glass, or other variable factors. In general, the amount of frit added usually varies from about 1% to about 15% by weight of the amount of base glass.

The above-described apparatus is only exemplary of several forms of apparatus which may be used in practicing the invention, and illustrates, rather schematically, the adoption of the method to existing forehearth constructions. For additional features of a suitable apparatus for mixing colorants in the glass furnace forehearth see U.S. Patent 3,057,175, R. R. Rough and A. B. Swain, Jr., issued on Oct. 9, 1962.

In carrying out the present invention, selection of the proper forehearth additive is of utmost importance. The material must be capable of considerably increasing the setting rate of the soda-lime baseglass, while being capable of readily admixing with the base glass at forehearth temperatures (i.e. 2,300° F.).

Ordinary soda lime glasses have setting rates of about 96–100 seconds. As mentioned above, the term "setting rate" is used as a yardstick to compare the potential working properties of a glass with those of other glasses. To obtain the setting rate, the temperature at which the glass has a log viscosity in poises of 3 and the temperature at which the glass has a log viscosity in poises of 7 are used as the limits of the forming range. When a glass article is formed, it must be cooled to a temperature at which the formed article will not sag or slump under its own weight upon being released from the forming mold. The faster this cooling can be accomplished, the more efficient will be the use of the forming mold. Thus, the rate at which glass articles can be fabricated, is directly related to the setting rate. The test procedures for the setting rate are known in the art and are described by Babcock and Burch in, Journal of the American Ceramic Society, vol. 21, (1938) p. 345.

During the past several years, glass compositions for the manufacture of glass containers have become faster setting. The setting rates have been reduced from about 108 to about 96 seconds, and automatic machinery speeds have increased accordingly. Unfortunately, further reduction in the setting rate on a basis of the full melter operation would be quite expensive and in many cases unjustified for the article being produced.

This invention is therefore of particular utility when minor variations in the forming characteristics of the glass are required. For instance, when the dimensions and/or weight of the glass containers being formed are changed only a few percent, it is usually not economical to modify the forming equipment to optimize the operation. By the method of the present invention, it is possible to reduce the setting rate of the glass by a few percent (e.g. setting rate of 95 or more is reduced to about 94 or less) and thereby economically "tailor" the composition to optimize the forming process for each forming machine. The advantages of the present invention are also realized when one melting furnace furnishes molten glass to several different forming operations.

I have now discovered how this can be accomplished by modifying the base glass as it flows to the forming machine from the melting furnace. This modification is effectuated through the addition of vitreous materials (hereinafter called glass frits) of the following composition range of alkaline earth aluminosilicates.

| Component | Percent by Weight | | |
| --- | --- | --- | --- |
| | General Range | Preferred Range | Especially Preferred Range |
| $SiO_2$ | 30–65 | 32–55 | 34–45 |
| $Al_2O_3$ | 5–25 | 6–20 | 8–14 |
| CaO | 15–50 | 20–45 | 34–43 |
| MgO | 0–30 | 3–20 | 6–16 |
| $Na_2O$ | 0–10 | 0–8 | 0–2 |
| $K_2O$ | 0–5 | 0–4 | 0 |

Usually glasses within the above composition range have the following properties:

Liquidus _____ ° F __ 2030–2350
Log viscosity—3 _____ ° F __ 2065–2600
Log viscosity—7 _____ ° F __ 1521–1736
Setting rate _____ seconds __ 40–70
Coefficient of thermal expansion
$66–90 \times 10^{-7}$ (0–300° C.)

The glasses of the above composition and properties can be prepared in ordinary equipment utilizing conventional techniques. It is understood that the choice of raw materials is governed primarily by economic considerations.

EXAMPLE I

In one specific embodiment of the present invention, a frit glass was made from batch materials to provide the following composition by melting and refining at 2500–2700° F. in a frit furnace under direct gas fire.

| Component: | Percent by weight |
| --- | --- |
| $SiO_2$ | 40 |
| $Al_2O_3$ | 10 |
| CaO | 40 |
| MgO | 9 |
| $Na_2O$ | 1 |

After the glass was melted it was converted to granulated frit by feeding as a stream from the outlet of the melting furnace and chilling rapidly. The chilling is effected by flowing the molten stream through water cooled rolls and then into a body of water so the glass breaks up into granular frit form. If desired, the granular glass frit can then be further reduced in particle size by grinding. I have found that powdered frit glass particles in the range of —8+30 mesh size are satisfactory for the purposes of this invention.

As an alternative method, the frit may be melted and directly fed into the forehearth in the molten form. It is therefore, contemplated that the term frit as used herein includes both forms of the glassy material.

The compositions, properties and batch materials of other exemplary frit glasses suitable for use in tailoring glass viscosities according to the present invention are set forth in Table I.

glasses are suggested as applicable for commercial container production.

TABLE I

|  | Ex. 2 | Ex. 3 | Ex. 4 | Ex. 5 | Ex. 6 | Ex. 7 | Ex. 8 |
|---|---|---|---|---|---|---|---|
| Oxide Composition (Compositions in Weight Percent): | | | | | | | |
| $SiO_2$ | 48.22 | 54.44 | 58.32 | 47.69 | 40.87 | 51.45 | 54.46 |
| $Al_2O_3$ | 13.38 | 15.13 | 15.97 | 13.53 | 11.40 | 14.11 | 15.16 |
| CaO | 30.23 | 21.24 | 16.03 | 24.95 | 24.42 | 15.71 | 13.02 |
| MgO | 0.22 | 0.18 | 0.16 | 6.29 | 16.54 | 10.32 | 8.33 |
| $Na_2O$ | 4.72 | 5.35 | 6.14 | 4.67 | 4.01 | 5.42 | 5.36 |
| $K_2O$ | 3.17 | 3.59 | 3.32 | 2.82 | 2.69 | 2.93 | 3.60 |
| $Fe_2O_3$ (Impurity) | 0.06 | 0.07 | 0.06 | 0.06 | 0.07 | 0.07 | 0.07 |
| Liquidus, °F | 2,400 | 2,320 | 2,285 | 2,295 | 2,390 | 2,270 | 2,250 |
| Log. vis. at liquidus | 2.00 | 2.80 | 3.29 | 2.13 | 1.22 | 2.47 | 3.0 |
| Log. vis. at °F.: | | | | | | | |
| 2 | 2,400 | 2,615 | 2,850 | 2,340 | 2,135 | 2,420 | 2,595 |
| 2.5 |  | 2,415 | 2,585 | 2,185 | 2,015 | 2,260 | 2,405 |
| 3 |  | 2,260 | 2,380 | 2,065 | 1,920 | 2,130 | 2,250 |
| 4 |  | 2,025 | 2,100 | 1,875 | 1,770 | 1,925 | 2,020 |
| 5 |  | 1,850 | 1,905 | 1,740 | 1,665 | 1,780 | 1,850 |
| 6 |  | 1,725 | 1,770 | 1,640 | 1,585 | 1,665 | 1,720 |
| 7 |  | 1,625 | 1,666 | 1,599₁ | 1,520 | 1,573 | 1,620 |
| 7.65 | 1,613 | 1,571 | 1,612 | 1,516 | 1,486 | 1,523 | 1,565 |
| Setting Rate, Sec |  | 60 | 62 | 54 | 48 | 58 | 60 |
| $\alpha \times 10^7$ (0-300° C.) | 86.5 | 80.1 | 76.5 | 80.7 | 79.8 | 74.6 | 73.0 |
| Batch ingredients (Percent by Weight): | | | | | | | |
| Spruce Pine Feldspar | 70 | 80 | 85 | 70 | 60 | 75 | 80 |
| Calcite lime | 30 | 20 | 15 | 15 |  |  |  |
| Dolomite lime |  |  |  | 15 | 40 | 25 | 20 |

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Oxide Composition (Compositions in Weight Percent): | | | | | | | | |
| $SiO_2$ | 42.77 | 42.61 | 54.26 | 42.72 | 43.19 | 48.70 | 48.60 | 48.74 |
| $Al_2O_3$ | 16.57 | 16.36 | 20.65 | 16.61 | 15.86 | 13.48 | 13.50 | 13.52 |
| CaO | 29.73 | 23.86 | 8.00 | 20.73 | 17.76 | 29.73 | 23.69 | 17.55 |
| MgO | 0.21 | 6.25 | 2.47 | 9.27 | 12.37 | 0.21 | 6.34 | 12.30 |
| $Na_2O$ | 7.07 | 7.14 | 9.86 | 7.07 | 7.15 | 7.33 | 7.32 | 7.33 |
| $K_2O$ | 3.57 | 3.71 | 4.53 | 3.54 | 3.57 | 0.42 | 0.42 | 0.42 |
| $Fe_2O_3$ (Impurity) | 0.08 | 0.07 | 0.06 | 0.06 | 0.10 | 0.13 | 0.13 | 0.14 |
| Liquidus, °F | 2,145 | 2,310 | 1,990 | 2,280 | 2,290 | 2,340 | 2,285 | 2,290 |
| Log vis. at liquidus | 2.48 | 1.97 | 4.92 | 2.0 | 1.92 | 1.94 | 2.03 | 1.94 |
| Log vis. at °F.: | | | | | | | | |
| 2 | 2,290 | 2,300 |  | 2,280 | 2,265 | 2,320 | 2,295 | 2,270 |
| 2.5 | 2,140 | 2,150 | 2,720 | 2,125 | 2,125 | 2,165 | 2,145 | 2,130 |
| 3 | 2,020 | 2,030 | 2,510 | 2,005 | 2,015 | 2,040 | 2,025 | 2,010 |
| 4 | 1,840 | 1,840 | 2,195 | 1,820 | 1,835 | 1,855 | 1,840 | 1,835 |
| 5 | 1,715 | 1,705 | 1,975 | 1,690 | 1,705 | 1,725 | 1,710 | 1,710 |
| 6 | 1,620 | 1,600 | 1,810 | 1,590 | 1,605 | 1,630 | 1,610 | 1,610 |
| 7 | 1,547 | 1,521 | 1,683 | 1,516 | 1,529 | 1,554 | 1,535 | 1,534 |
| 7.65 | 1,508 | 1,476 | 1,615 | 1,474 | 1,486 | 1,513 | 1,493 | 1,493 |
| Setting Rate, Sec | 53 | 58.5 | 67 | 57 | 64 | 53 | 55 | 54 |
| $\alpha \times 10^7$ (0-300° C.) | 95.2 | 90.8 | 85.7 | 87.3 | 76.3 | 87.1 | 81.9 | 76.6 |
| Batch ingredients (Percent by Weight): | | | | | | | | |
| Nepheline syenite | 70 | 70 | 90 | 70 | 70 |  |  |  |
| Western feldspar |  |  |  |  |  | 70 | 70 | 70 |
| Calcite lime | 30 | 15 | 5 | 7.5 |  | 30 | 15 |  |
| Dolomite lime |  | 15 | 5 | 22.5 | 30 |  | 15 | 30 |

Before describing the specific manner in which frits of this invention are incorporated into soda-lime base glasses to produce faster setting composite glasses, a description of suitable base glasses will be provided to serve as an appropriate background upon which the invention can be superimposed.

Base glasses used in the present invention are usually within the composition range set forth below.

| Constituent: | Percent by weight |
|---|---|
| $SiO_2$ | 60–75 |
| $Al_2O_3$ | 0.3–10 |
| $CaO+MgO$ | 6–15 |
| $Na_2O$ | 12–18 |
| $K_2O$ | 0–5 |
| BaO | 0–5 |

In addition to the constituents listed above, the base glasses usually contain small amounts of decolorizing agents and refining agents.

The conditions, materials and procedures for making the above base glasses are well known in the art, as exemplified in Table IX, B-11 on p. 245 of "Handbook of Glass Manufacture," by Tooley, Ogden Publishing Company, New York, N.Y., 1953.

In accordance with the broad principles of the present invention, the frit glasses can be added to substantially any soda-lime base glass. Accordingly, the exemplary

EXAMPLE 17

A commercial soda-lime base glass of the following composition and properties was melted and refined from ordinary materials.

Component:
| | |
|---|---|
| $SiO_2$ ____percent by weight__ | 72.1 |
| $Al_2O_3$ ____do__ | 1.7 |
| CaO ____do__ | 11.6 |
| MgO ____do__ | 1.0 |
| $Na_2O$ ____do__ | 13.4 |
| $K_2O$ ____do__ | 0.2 |
| Log viscosity=3 at | 2,152° F. |
| Log viscosity=7 at | 1,411° F. |
| Setting rate ____seconds__ | 96.3 |
| Coefficient of thermal expansion | $89 \times 10^{-7}/°$ C. (0–300° C.) |

To the above base glass the frit of Example I was added at forehearth temperatures and thoroughly admixed in an amount equal to 5% by weight of the base glass.

The resulting composite glass had the following forming characteristics while the other properties such as chemical durability and thermal expansion were not adversely affected.

| | |
|---|---|
| Log viscosity=3 at | 2,138° F. |
| Log viscosity=7 at | 1,421° F. |
| Setting rate ____seconds__ | 92.5 |

It is apparent that the Setting Rate was improved by 4.1 seconds while the temperature span of the working range was substantially modified and reduced from 741° F. to 717° F. A corresponding improvement was realized in the process of fabricating various glass articles.

EXAMPLE 18

The frit glass of Example 1 was added to the base glass of Example 17, according to the method of Example 17 except that the amount added was equal to 10% by weight of the base glass.

The resulting composite glass had the following forming properties without detracting from the other glass properties.

Log viscosity=3 at _____ 2,121° F.
Log viscosity=7 at _____ 1,432° F.
Setting rate _____seconds__ 88.5

It is apparent that the Setting Rate was improved by 7.8 seconds while the temperature while the temperature span of the working range was substantially modified and reduced from 741° F. to 689° F. A corresponding improvement was realized in the process of fabricating glass articles.

The foregoing demonstrates that I have discovered a novel process for manipulating the viscosity-temperature relationship of soda-lime base glass for the purpose of optimizing the process of fabricating glass articles.

I claim:

1. In a method of altering the viscosity of soda-lime glass, the steps of preparing a molten soda-lime base glass, flowing the molten base glass through a forehearth, adding to the molten glass in the forehearth an alkaline earth-aluminosilicate frit glass, in an amount sufficient to produce a composite glass having a faster setting rate than said soda-lime base glass.

2. A method of claim 1, wherein said frit glass is of the composition range:

| Composition: | Percent by weight |
|---|---|
| $SiO_2$ | 35–65 |
| $Al_2O_3$ | 5–25 |
| CaO | 15–45 |
| MgO | 0–30 |
| $Na_2O$ | 0–10 |
| $K_2O$ | 0–5 |

3. A method of claim 2, wherein the amount of frit glass added ranges from about 1% to about 15% by weight of the molten base glass.

4. A method of claim 3, wherein said base glass is of the range:

| Constituent: | Percent by weight |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |

5. A method of claim 4, wherein said frit glass is of the composition range:

| | Percent |
|---|---|
| $SiO_2$ | 32–55 |
| $Al_2O_3$ | 6–20 |
| CaO | 20–45 |
| MgO | 3–20 |
| $Na_2O$ | 0–8 |
| $K_2O$ | 0–4 |

6. In a method of making a fast setting glass including the melting of a soda-lime base glass batch, and the flowing of the molten base glass stream through a forehearth, the improvement of adding to the forehearth stream, an alkaline earth aluminosilicate glass frit consisting essentially of:

| | Percent |
|---|---|
| $SiO_2$ | 34–45 |
| $Al_2O_3$ | 8–14 |
| CaO | 34–43 |
| MgO | 6–16 |
| $Na_2O$ | 0–2 | to produce a composition glass having a faster setting rate than said base glass.

7. A method of claim 6, wherein the setting rate of said base glass is at least 95 seconds.

8. A method of claim 7, wherein the amount of frit glass added ranges from 1% to 15% by weight of said base glass.

9. A method of claim 8, wherein the setting rate of said composite glass is no greater than 94 seconds.

10. A method of claim 9, wherein the frit composition is:

| | Percent |
|---|---|
| $SiO_2$ | 40 |
| $Al_2O_3$ | 10 |
| CaO | 40 |
| MgO | 9 |
| $Na_2O$ | 1 |

References Cited

UNITED STATES PATENTS 2,955,948  10/1960  Silverman _____ 106—52
3,024,121   3/1962  Hagedorn _____ 106—52

HELEN M. McCARTHY, *Primary Examiner.*

W. R. SATTERFIELD, *Assistant Examiner.*

U.S. Cl. X.R.

65—134